Nov. 3, 1959   J. M. M. NEUFVILLE ET AL   2,911,541
GENERATOR SYSTEM FOR SUPPLYING AUXILIARY POWER ON BOARD SHIP
Filed April 27, 1956   4 Sheets-Sheet 1
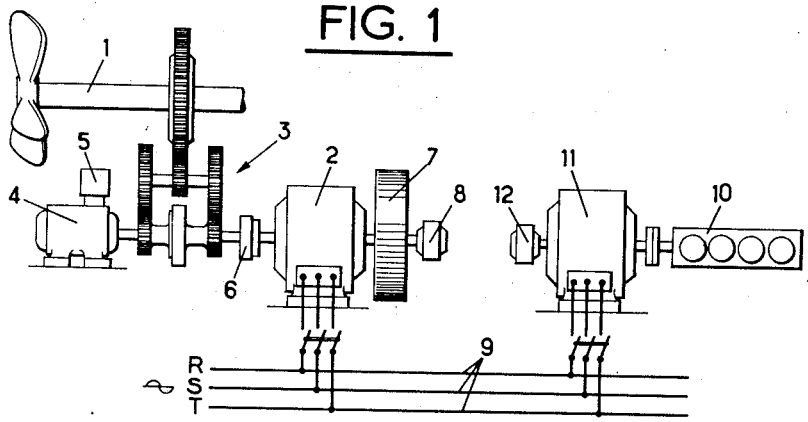
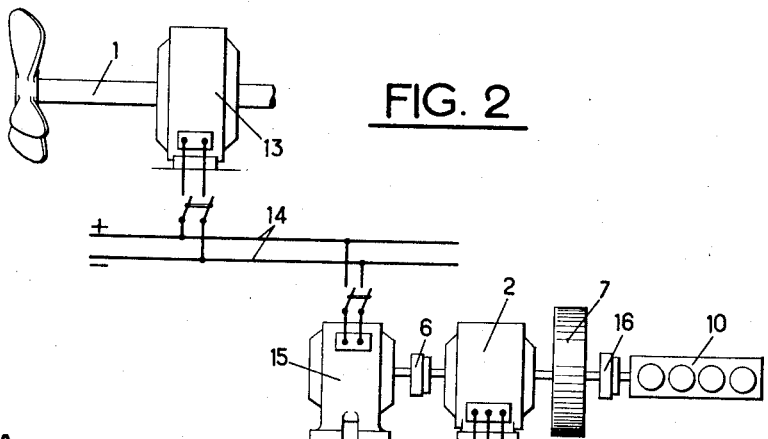
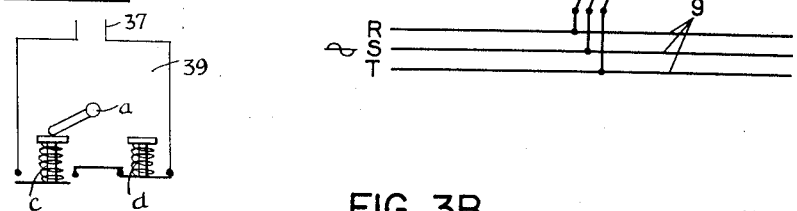
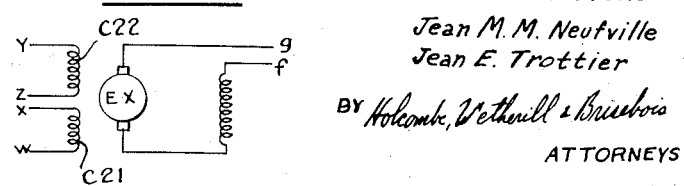
INVENTORS
Jean M. M. Neufville
Jean E. Trottier
ATTORNEYS

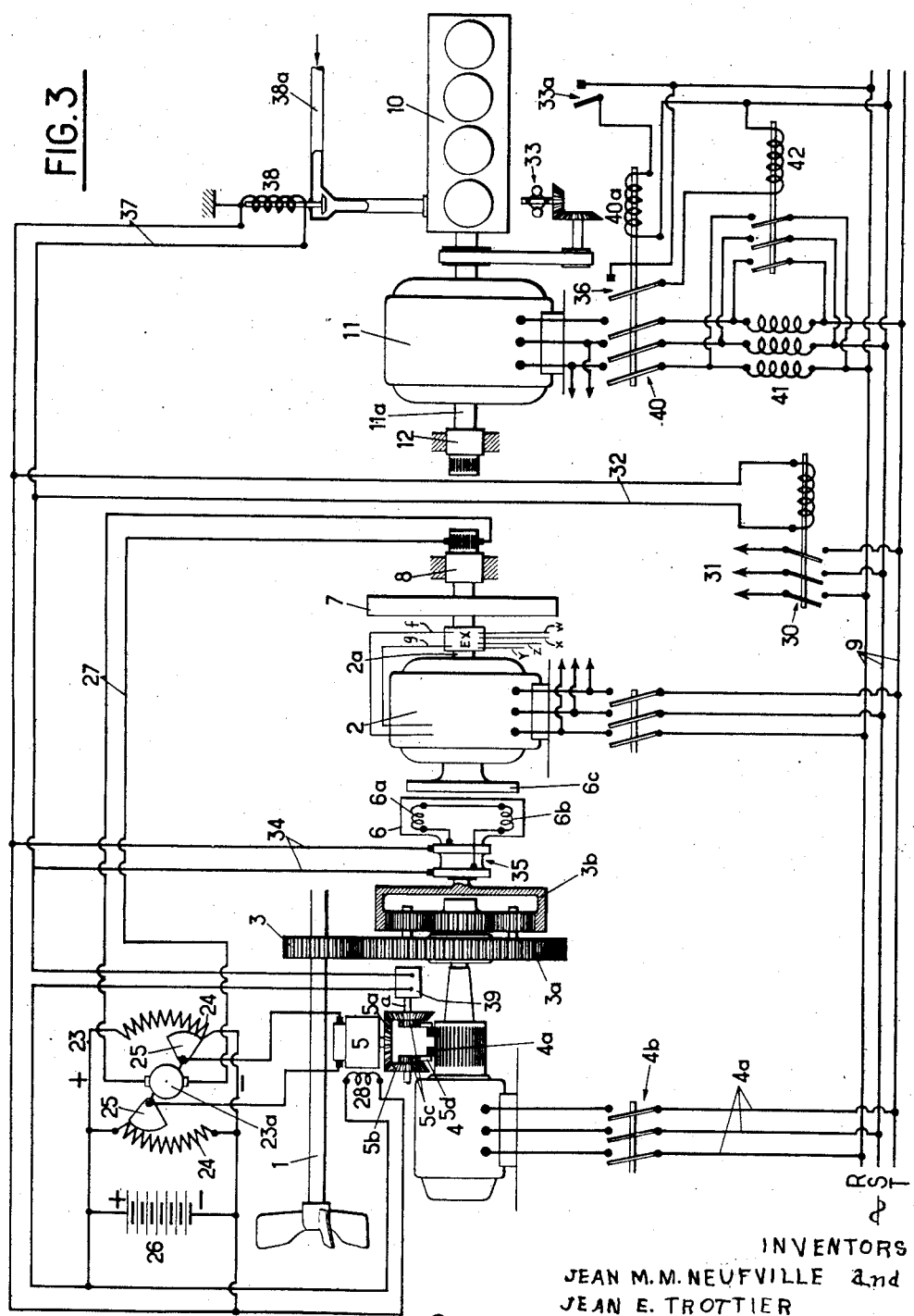

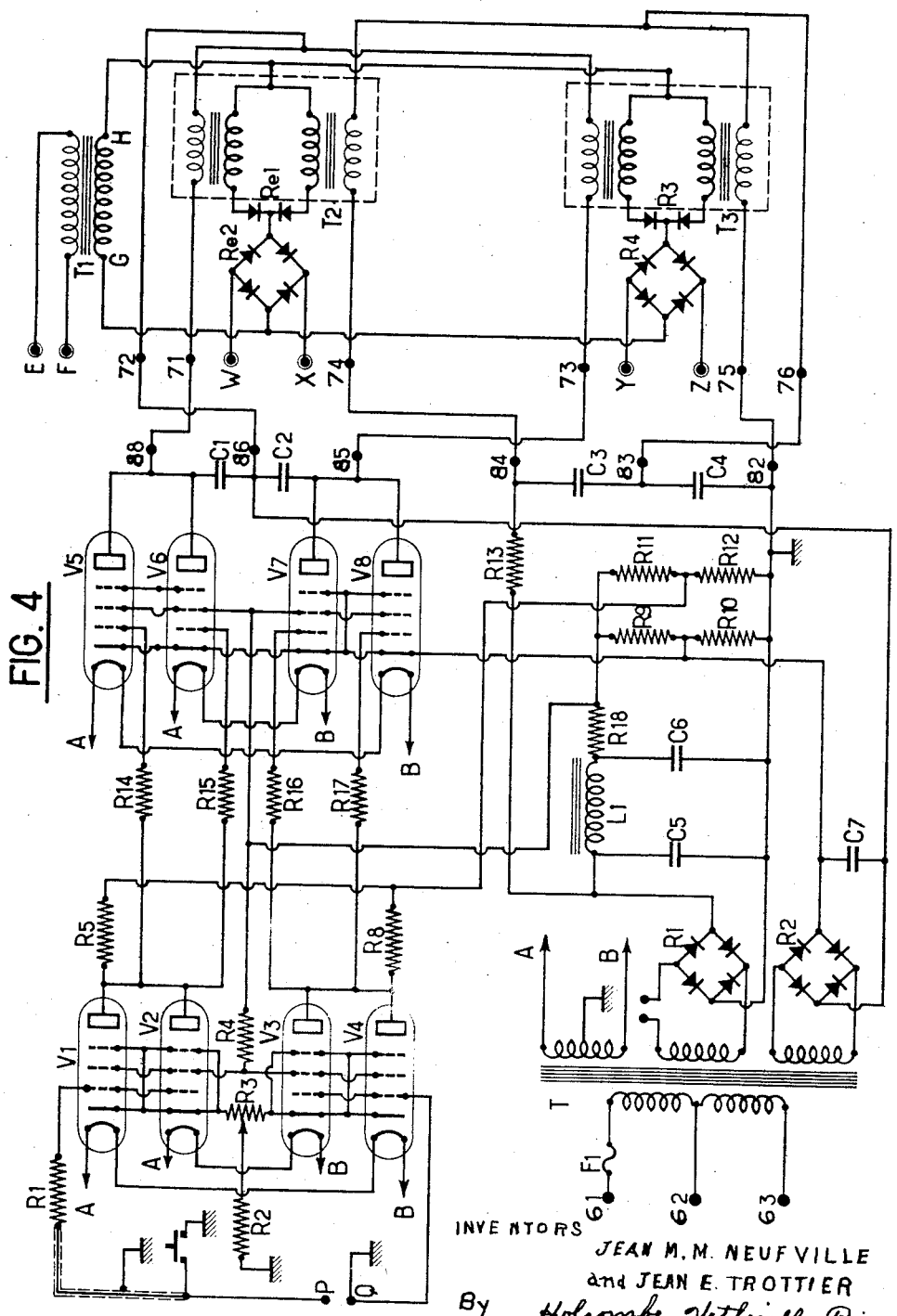

Nov. 3, 1959     J. M. M. NEUFVILLE ET AL     2,911,541
GENERATOR SYSTEM FOR SUPPLYING AUXILIARY POWER ON BOARD SHIP
Filed April 27, 1956     4 Sheets-Sheet 4

INVENTORS
JEAN M. N. NEUFVILLE
and JEAN E. TROTTIER

By Holcombe, Wetherill, Brisebois
ATTORNEYS

United States Patent Office 2,911,541
Patented Nov. 3, 1959

2,911,541

GENERATOR SYSTEM FOR SUPPLYING AUXILIARY POWER ON BOARD SHIP

Jean Marie Marcel Neufville and Jean Emile Trottier, Nevilly-sur-Seine, France

Application April 27, 1956, Serial No. 581,247

Claims priority, application France March 15, 1954

13 Claims. (Cl. 290—4)

The present application is a continuation-in-part of our copending application filed on March 8, 1955, under Serial No. 492,964 and now abandoned.

As mentioned in our copending application, our invention relates to an assembly of electric current generators for supplying auxiliary services on board ship in which at least one electric generator which feeds the electric devices included in the auxiliary services is normally driven by the propeller shaft, and, in case of a break down of this shaft or of the motor which normally drives it, the generator is driven by an independent auxiliary prime mover, or is relieved by an independent group of auxiliary generators.

It is known to have at least one of the generators for feeding the auxiliary services driven by the propeller shaft, in order to make use of the fact that the main engine or engines which drive the propeller shaft, and also the generator or generators for feeding the auxiliary services, have a greater thermo-dynamic or mechanical output than those of the motors of independent groups of lesser power. These main engines are usually driven by heavy fuel oils, while the auxiliary engines or motors of lesser power are usually driven by diesel oils of higher price. Furthermore, the use of the main engines in normal service effects considerable saving in material, particularly repair parts, and renders it possible to make use of labor in particularly economical conditions. However, this type of drive for the auxiliary generators, has the drawback of rendering such generators dependent upon the normal running of the main engines and consequently the running of the ship, and in case of a break-down of the main engines for any reason, the auxiliary generators will be stopped or seriously impeded.

For this reason it is known, in cases of break-down of the main engines, to substitute groups of independent generators to drive the auxiliary generators or independent motors, for the transmission between the propeller shaft and the auxiliary generators. However, in the known arrangements, there is no certainty that the substitution can be made sufficiently quickly to avoid interruption in the supply of energy (electric current) to the auxiliary services. It is possible, therefore, that certain auxiliary services such as lighting for example, may be interrupted, which might cause great inconvenience in the running of the ship.

In order to eliminate this risk, it has been proposed to substitute independent prime movers for the arrangements for driving by the propeller shaft, the substitution being effected automatically. However, the known arrangements for this purpose are complicated and costly, do not function sufficiently quickly and are not sufficiently safe to meet all requirements for a safe and economic running.

The present invention provides an improved arrangement, for the driving of the engines or motors for the auxiliary services on board ship, and relates to an arrangement by means of which an independent prime mover is, if required, automatically substituted for the transmission between the propeller shaft and at least one auxiliary generator, such substitution taking place under such conditions so as not to interrupt the feeding of the auxiliary services, and so that there will not be undesirable variations in the voltage or in the frequency of the current supplied to them.

The arrangement according to the present invention is essentially characterized by the fact that the main generator driven by the propeller shaft is coupled with a flywheel, the generator being driven by the propeller shaft through a clutch which can be disconnected while in operation. The arrangement includes an electrical device, or an equivalent mechanical device, which reacts as soon as the speed of the generator descends below a predetermined speed, and brings about the uncoupling of the generator from the propeller shaft and puts into operation at least one independent auxiliary group, and couples it in parallel with the main generator, which although separated mechanically from the propeller shaft, is maintained in rotation by the flywheel, or else puts into operation and automatically couples with the main generator, an independent prime mover, while maintaining practically the frequency and the voltage of the current which feeds the auxiliary services.

In order that the invention may be clearly understood, reference will be now made to the accompanying drawings which illustrate four preferred embodiments by way of examples, and in which:

Fig. 1 illustrates an embodiment in which the main generator is driven by the propeller shaft by means of a mechanical transmisison;

Fig. 2 illustrates an embodiment in which the main generator is driven by an electrical transmission including a generator driven by the propeller shaft, and a motor driven by a clutch which can be disconnected, the main generator being capable of being driven through another clutch by an independent prime mover;

Fig. 3 illustrates an arrangement in accordance with Fig. 1, which also includes certain auxiliary apparatus and accessory devices;

Fig. 3A is a schematic end view of the control switch 39 mounted on the shaft $a$;

Fig. 3b is a schematic diagram showing the connections of the coils of the exciter EX;

Fig. 4 illustrates, by way of a schematic view, the voltage regulating system, which is included in the arrangement according to Fig. 3;

Figure 4A:
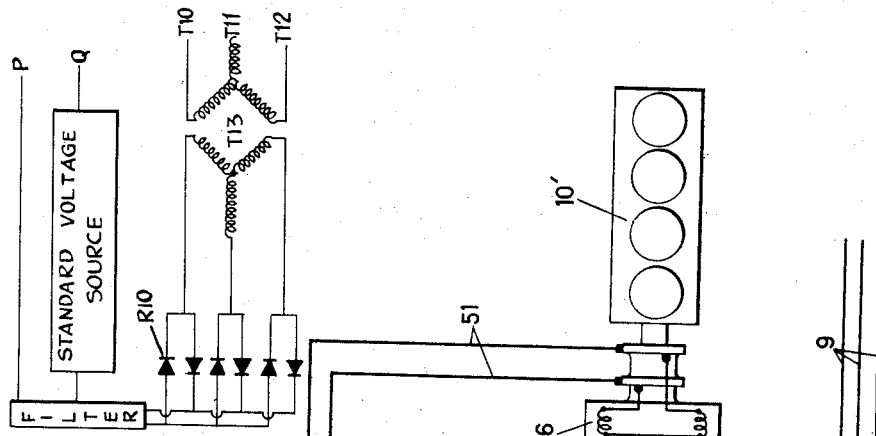
Fig. 4A is a circuit diagram showing how a voltage derived from an alternator to be regulated by the voltage regulating apparatus of Figure 4 is fed to said voltage regulating apparatus.

The arrangement shown generally in Figure 1 and in greater detail in Figure 3 is set up to supply the auxiliaries with three phase current. It includes a generator group normally driven by the propeller shaft 1 and comprising a main alternator 2 driven by the shaft 1 through a speed varying device consisting of an epicyclic differential gear train 3, the planetary 3a of which is driven by a three phase shunt motor 4. The arrangement is such that the speed of the output gear 3b is the average of that of the two input gears driven by the propeller shaft and motor 4. This motor is supplied with power from the main supply lines and its speed may be varied by shifting the position of its brushes 4a. The motor 4 is controlled by a servo-motor 5 which adjusts the displacement of the brushes 4a and consequently the speed of rotation of the motor 4. The servo-motor 5 is in turn actuated by a voltage regulator 23 provided with rolling sectors 25, the torque motor 23a of which is connected to a tachometric generator 8. The function of the voltage regulator 23 is to maintain a substantially constant frequency at the terminals of the alternator 2, and consequently in the distribution system. The tachometric generator is driven directly by the shaft 2a of the generator 2. Its speed and the frequency of the current which it supplies are thus dependent upon the speed and the frequency of the current supplied by generator 2. If the voltage at the terminals of the tachometric generator 8 varies, the voltage regulator 23 varies the current in the resistances 24 of the regulator 23, on the contacts of which the sectors 25 roll so as to more or less short circuit the resistances. These resistances 24 are connected as in a potentiometer to the terminals of a storage battery 26. The current which flows through the sectors 25 may thus change direction and may in this manner drive in either a clockwise or counterclockwise direction, the servo-motor which controls the three-phase variable speed motor 4 through the bevel gearing 5a and 5b, the side gears 5b being fixed to spur gears 5c which cooperate with the toothed brush carrying yokes 5d. The speed of rotation of the three-phase commutator motor 4 is varied by shifting the yokes 5d which are fixed to the brushes 4a so that one brush moves in a positive and the other an equal distance in a negative direction with respect to a given base position. This base or zero position at which the two brushes are positioned opposite each other is that for which the motor turns at its synchronous speed. If the brushes are shifted in one direction with respect to each other the speed of the motor decreases; if they are shifted in the other direction with respect to each other the speed increases. Consequently, if the speed of the propeller shaft decreases, the voltage regulator 23 acts through the servo-motor 5 to so shift the brushes 4a in opposite directions as to increase the speed of the motor 4 and the gear 3a which tends to prevent any reduction in the speed of gear 3b and consequently any decrease in speed of the main generator 2. If the shifting of the brushes reaches the limit of displacement permitted by the construction of the motor 4, it closes contacts 39, thereby actuating electro-magnetically actuated valve 38 through the line 37 so as to substitute the auxiliary generator 11 for the main generator 2 as a source of current for the distribution line 9. The alternator 2 is connected to the epicyclic train 3 and thus to the propeller shaft by a mechanical, or preferably by an electromagnetic clutch, as shown. A flywheel 7 having a large moment of inertia ($ml^2$) is mounted near the end of the alternate shaft and is followed by the tachometric dynamo 8 which has already been mentioned and which feeds the lines 27. The arrangement shown in Figure 3 also includes auxiliary machines, namely at least one auxiliary generator group comprising a prime mover 10, preferably a diesel motor, coupled to the aforesaid auxiliary generator 11, having the same frequency and operating voltage as the principal alternator 2, and provided with an exciting dynamo 12 mounted on the end of its shaft 11a.

Finally, for the sake of completeness, the equipment includes the auxiliary devices already mentioned for automatically effecting the desired operations, namely: the voltage regulator 23; the contacts 39; the magnetic clutch 6; the overload switch 30 which, at the moment of an emergency maneuver, cuts off the current to all of the circuits not then essential; the synchronizing apparatus 40, 41 and 42; and the contact closing tachometer 33.

The magnetic clutch 6 comprises two plates 6b and 6c made of magnetic metal which are held together by an electro-magnet 6a inside the clutch 6 which turns therewith. This electro-magnet is supplied with direct current through the lines 34 connected to the terminals of the storage battery 26. When the circuit 34 is closed, the current from the battery 26 feeds the electro-magnet 6a, which draws together the two clutch plates 6b and 6c, and the propeller shaft 1 drives the main generator 2. When the circuit 34 is open, the electro-magnet 6a is no longer energized, the clutch 6 is released, and the main generator is mechanically disconnected from the propeller shaft 1.

When the clutch 6 is released, the principal alternator 2 continues to turn, being driven by the flywheel 7. When the contacts 39 open because the brushes 4a have reached the limit of their maximum displacement with respect to each other, the current through the electro-magnet 6a is cut off as well as that supplying the electro-magnetically operated valve 38 which controls the supply of compressed air arriving through the pipe 38a from auxiliary storage tanks (not shown) to the emergency motor 10 which has already been referred to. This motor then starts up and rapidly attains its normal speed. When the auxiliary generator 11 has attained a speed corresponding to a frequency equal to that of the main generator 2, the contact closing tachometer 33 driven by the shaft 11a of the generator 11 closes the contacts 33a and thereby energizes the coil 40a on automatic break switch 40. The switch 40 connects the auxiliary generator to the distribution system 9 through the resistances 41. Auxiliary contacts 36, slightly retarded in their closing by a time lag device, then transmit current to the coil of the automatic break switch 42 and the resistances 41 are short circuited. The contact closing tachometer 33 is so adjusted as to cause the closing of the automatic switch 42 at a moment when the frequency of the generator 11 is still slightly less than that of the generator 2. The connection of the auxiliary generator 11 in parallel with the main generator 2 through the distribution lines 9 is thus accomplished without difficulty.

The arrangement shown in Figs. 1 and 3 functions as follows:

When running normally, the supply of current is insured without difficulty by the alternator 2, turning at a constant speed.

In the case of variation of the speed of rotation of the shaft 1, particularly in the case of slowing down, the electronic (or electro-magnetic) equipment for controlling the displacement of the brushes of the commutator type motor 4 reacts by acting upon the servo-motor 5 in the required direction, in order to avoid reduction in the speed of rotation of the alternator 2 and the frequency in the distribution line 9.

If the slowing down is only slight, and if the speed of rotation of the shaft 1 remains above a predetermined minimum, the necessary correction will be obtained before the commutator type motor 4 has attained its maximum speed, and the only result will be a modification of the relationship between the transmission and the differential 3 to adapt the manner of functioning of the latter to the new speed of the ship.

If the cause of the slowing down disappears, the commutator type motor 4, under the effect of the frequency regulator, diminishes its speed as the speed of the shaft 1 increases, and the normal speed is re-established without there having been any variation in the frequency.

On the contrary, if the speed of rotation of the shaft 1 continues to diminish, the commutator type motor 4 reaches its maximum speed corresponding to the maximum angular displacement of the brushes, and from this moment onwards it is no longer possible to maintain at their normal values the frequency and the voltage of the current supplied by the alternator 2.

Now begins the "troubled" period, of short duration and variable frequency, a period in which, according to the invention, there is automatically effected the substitution of the independent auxiliary groups 10—11 for the alternator 2.

The apparatus comprises a group of electrical devices controlled through the control switch 39 mounted on the three-phase commutator motor 4, and consisting of limit switches $e$ and $d$ which are mounted on the shaft $a$ which carries the yoke which carries the brush and are actuated when said brush arrives at the permissible limit of its displacement. (See Fig. 3A.) This provides for the following operations:

(a) The automatic instantaneous disconnection of the generator 2, which is accomplished by opening the circuit 34 which supplies the electro-magnet 6a, thereby releasing the magnetic clutch 6, the alternator being subsequently driven by the flywheel 7.

(b) The automatic starting up of the emergency group 10—11, by means of the electromagnetically operated valve 38, the prime mover 10 accelerating rapidly under the control of its own governor.

(c) The connection of the auxiliary alternator 11 in parallel by means of the apparatus 40, 41, 42 already described and the contact type tachometer 33.

(d) The cutting off of the auxiliary circuits not then indispensable (to avoid overload). This is accomplished by opening the automatic switch 30 which normally connects to the distribution line 9 the circuits connected to its terminals 31. When the rack which carries the brushes 4a of the three-phase commutator motor 4 reaches the end of its path, the limit switch 39 cuts off the current feeding the coil which holds in a closed position the break switch 30 which is spring biased to an open position, thus cutting out those circuits which need not be supplied with current during an urgent maneuver, such as those leading to the kitchen, winches, windlasses, ventilators, etc., which can be placed temporarily out of service without serious inconvenience.

The alternator 11 is provided, not with electromechanical regulators, but with electro-magnetic or electronic regulators, suitably connected, as is known. These regulators have the advantage of eliminating any delay between the increase of speed and increase of tension at the terminals. On the other hand, the placing in parallel is effected, not at that precise moment when the alternator to be coupled, in the increase of its speed, reaches exactly the frequency of the alternator which is already running, but before the precise concordance is reached, even if the phases are not yet in concordance. As an example, we will describe an electronic regulator, schematically represented on the Fig. 4. Such regulator is provided in order to be inserted in the assembly schematically represented in the Fig. 3. The input terminals of this regulator are marked in the Fig. 4 by the references 61, 62, 63 and are connected with the output lines of the alternator 2. The transformer T feeds the detection organ or element of this regulator. In the Fig. 3, the corresponding lines are marked by arrows, and in the Fig. 4, the arrivals of the same lines to the input terminals of transformer T, are also marked by arrows. Transformer $T_1$ is fed through the terminals E, F, from the output lines of alternator 11.

This regulator comprises an LR5C amplifier and a group of saturable reactors $T_2$ and $T_3$. The saturable reactors $T_2$ and $T_3$ are controlled by the amplifier so as to increase, decrease or reverse the excitation of the exciter.

The principle on which the regulation is based consists in comparing the voltage to be regulated to a standard voltage. When the difference between these two voltages is zero, the regulator remains inactive. When a difference exists, the regulator comes into action to bring the terminal voltage of the machine being regulated to the standard voltage.

The voltage being regulated is first rectified, the standard voltage being direct. As seen on Figure 4A, the terminals of the alternator to be regulated are connected to the input terminals T10, T11, T12 of a star connected transformer T13, which reduces the voltage, after which the current is rectified by a set of rectifiers R10, and passed through a conventional filter arrangement. The rectified and filtered current is then opposed to that of a standard voltage source and the difference between the two voltages is fed to the input terminals P, Q (Fig. 4) of the LR5C amplifier and brings the grids of the tubes $V_1$, $V_2$, $V_3$, $V_4$ to a certain potential, positive, negative or zero. The tubes $V_1$, $V_2$ and $V_3$, $V_4$ are mounted in pairs in push-pull. When the voltage difference is zero, the grids of the tubes $V_1$, $V_2$ and $V_3$, $V_4$ are at the same potential, as well as the grids of the tubes $V_5$, $V_6$ and $V_7$, $V_8$ and the currents delivered by these tubes are equal. If the voltage difference is not zero, the voltage applied to the grids of $V_1$ and $V_2$ is, according to its polarity, greater or less than the voltage applied to the grids of $V_3$ and $V_4$. The same is true of the tubes $V_5$ and $V_8$, which supply current to the saturation coil of the saturable reactors $T_2$ and $T_3$.

The saturable reactor $T_2$ controls the alternating current fed in from the output lines of alternator 11 (or any other suitable A.C. source) at the terminals E, F, which, after having been rectified in the rectifier $Re$ 2, feeds through terminals W and X the additive exciting coil C21 of the exciter EX of the alternator being regulated. The transducer $T_3$ is connected through Y and Z to the subtractive exciting coil C22 of the exciter of the alternator being regulated. The coils of the exciter EX are diagrammatically illustrated in Fig. 3B. As is well known, saturable reactors function as variable inductances. When one inductance is permanently saturated, the variation in ampere turns due to the current which passes through it does not cause any change in the flux, the inductance is therefore ineffective and the current passes through it without difficulty. In order to permanently saturate the inductance the special saturable induction coil is supplied with a direct saturating current furnished by the plates of the tubes $V_5$, $V_6$, $V_7$, $V_8$ (Fig. 4). If the voltage difference is zero, the tubes $V_5$, $V_6$, $V_7$, $V_8$ do not deliver any current and the inductances are excited only by the permanent excitation current applied across the terminals 14, 13 and 12 (Fig. 4). This current is provided by the power supply circuit at the lower left hand side of Figure 4, which is fed from the alternator 2, as indicated by the arrows on Fig. 3. If the voltage difference is not zero, and this difference increases, the excitation of the saturable reactor $T_2$ increases while that of saturable reactor $T_3$ decreases, or vice versa. The alternating current which passes through the saturable reactors undergoes corresponding modifications, and so, consequently, does the direct current supplied by the rectifiers. As will readily be seen, the direct current is greater in the additive circuit WX and less in the subtractive circuit YZ and vice versa, depending on the polarity of the voltage difference. The point about which the continuous exciting current varies is determined by two desaturation coils which are permanently adjusted when installed. It will be understood that terminals A and B of the heaters for the cathodes of the tubes $V_1$–$V_8$ are each connected to terminals A and B of the power supply respectively. These connections have been omitted to avoid unduly complicating the drawing. Reference numerals 71, 72, 73, 74, 75 and 76 on Fig. 4 indicate the terminals of the transducers to which the terminals 82, 83, 84 of the power supply circuit and 85, 86, 88 of tubes $V_5$, $V_6$, $V_7$ and $V_8$ are connected in the manner shown in that figure.

In order to bring the auxiliary alternator into operation without encountering a synchronization problem, the arrangement shown in Figure 3 comprises the apparatus which will now be described. The alternator 11 is designed for a very low permanent short-circuit current, so that at the instant of connection the alternator 11 and the alternator 2 may freely exchange their short circuit currents without thereby opening any of the relays which are designed to disconnect them from each other, or excessively heating the conductors, or overloading the connections at the ends of the coils. On the other hand, the damper cage which is mounted in the openings of the iron of the inductor of alternator 11 is strongly constructed and comprises a number of bars sunk into the iron. In this way the asynchronous torque developed in the alternator at the time of connection is very strong and tends to accelerate the alternator which is turning at a very low speed. At the moment of connection the torque of the primary motor 10 combines with the asynchronous torque developed by the damper of the alternator 11 and the resultant torque almost instantaneously overcomes the retardation of whichever alternator is turning the least rapidly. As shown in Figure 3, the alternator 11 drives a contact type tachometer 33 so adjusted as to close contacts 33a just before the point of synchronism is reached. These contacts 33a close the circuit which includes the coil which, when energized, closes the contacts 40. When the contacts 40 are closed, the auxiliary alternator 11 is connected across the distribution line 9 in parallel with the main alternator 2, through resistances 41. The value of these resistances is such as to pass a sufficiently strong current to develop a substantial asynchronous torque without, however, producing too violent a disturbance of the voltage. Any such disturbance, however, lasts only a fraction of a second. When the contacts 40 are closed, this causes the closing of auxiliary delayed action contacts 36, the action of these contacts is delayed only for a fraction of a second and the exact duration of the delay is regulated by a time delay device (not shown). An instant later, sufficient to permit the auxiliary alternator 11 to come into synchronism and in phase with the main alternator 2, the contacts 42 close in their turn, short-circuiting the resistances 41 and the connection in parallel is completed.

Figure 5:
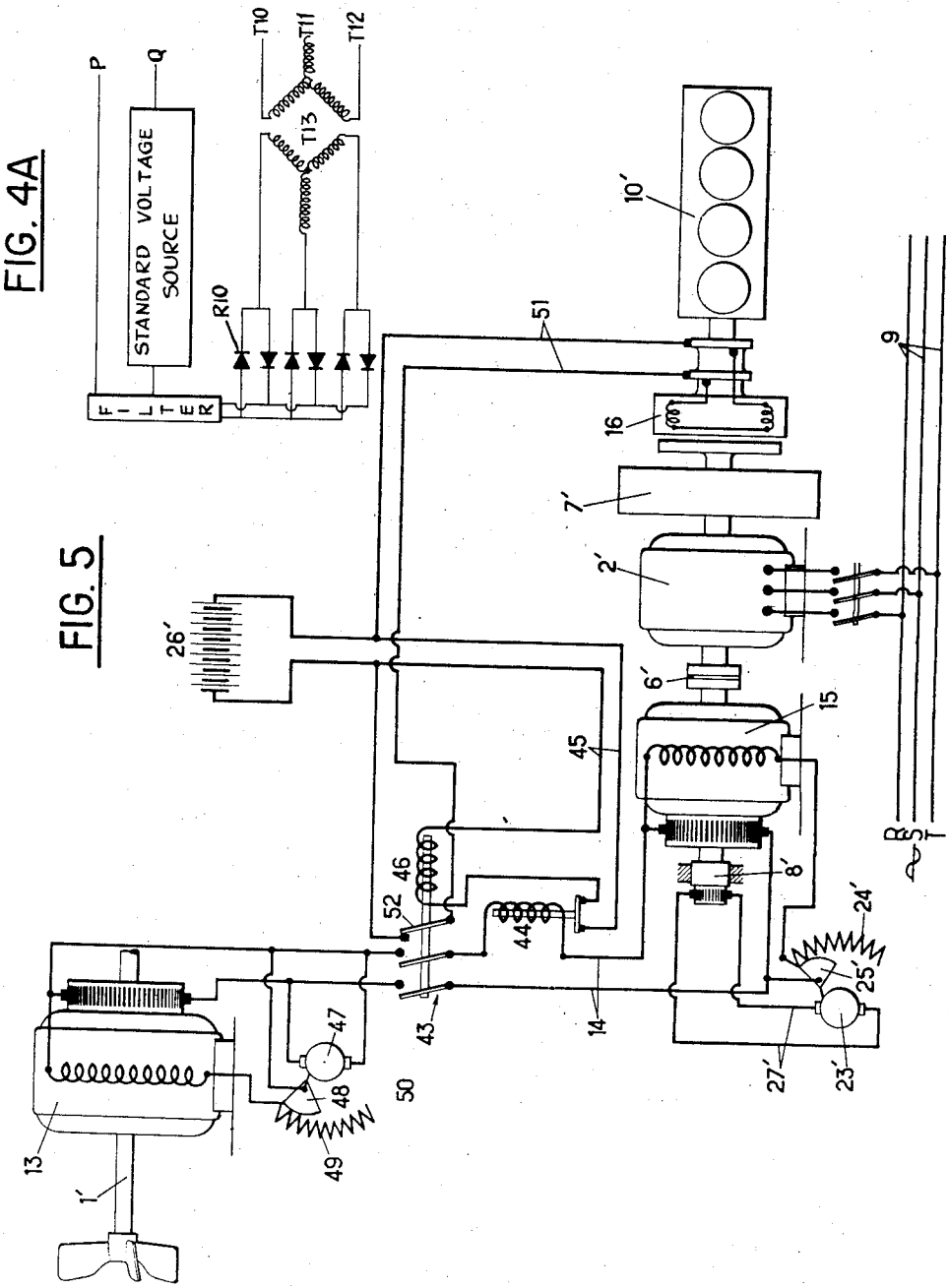
Fig. 5 illustrates an arrangement in accordance with Fig. 2, which also includes certain auxiliary apparatus and accessory devices.

Figure 5 shows another means for carrying out the invention, in which the transmission between the propeller shaft 1' and the main alternator 2' is electric. This transmission comprises a direct current generator 13 driven by the propeller shaft 1' and a direct current motor 15. A low speed generator (about 110 r.p.m.) mounted directly on the propeller shaft 1', may be used.

The generator 13 supplies the line 14, and a motor 15 also of the direct current type, drives the main alternator 2', which is coupled to a flywheel 7'.

The frequency of the alternator 2' is controlled by a regulator 23' comprising a single rolling sector 25' which includes in or removes from the excitation circuit of the motor 15 the adjusting resistances 24'. The torque motor 23' of the regulator is connected through the wires 27' to the terminals of the tachometric generator 8'. As in the embodiment of Figure 3, the tachometric generator 8' is responsive to the speed of the main alternator 2' and delivers a voltage proportional to the frequency of the alternator 2'. If the voltage supplied to the circuit 14 is constant, the regulator remains substantially stationary in a predetermined position. This occurs during normal operations, when the ship travels at its usual speed and the speed of rotation of the propeller shaft is constant. The excitation of the generator 13 is then nearly constant and the regulator 50 which controls it is substantially stationary. If the speed of the ship decreases, the regulator 50 eliminates some of the resistances 49 to counteract the influence of this reduction of speed on the voltage in the lines 14, the torque motor 47 of the regulator being connected across these lines. So long as the regulator 50 maintains the voltage in the lines 14 constant, the regulator 23' remains substantially stationary. But when the sector 48 of the regulator 50 arrives at the end of its path and all the resistances 49 are eliminated, the voltage in the lines 14 begins to decrease. At this moment the regulator 23' goes into action to reduce the excitation of the motor 15 so that the speed of the motor 15 remains constant despite the decrease in voltage across its terminals.

If the electricity is transmitted as alternating current the direct current generator 13 is replaced by an alternator, the output voltage of which is independent of its excitation. The voltage at its terminals is thus proportional to its speed, the inductance and flux remaining constant. The direct current motor 15 is replaced by a three-phase commutator type variable speed motor which operates with varying voltage and frequency, but a constant flux and speed. The shifting of its brushes is regulated, as in the embodiment of Figure 3, by a regulator having two rolling sectors mounted as shown in Figure 3.

In either case, the main alternator may preferably be driven by the prime mover 10' and replace the auxiliary alternator 11 shown in Figure 3. For this purpose the coupling 6' (between the principal alternator 2 and the transmission which is driven by power supplied by the propeller shaft and comprises the motor 15 and generator 13) can not be disconnected while the device is in operation. A magnetic clutch 16, similar to that of Figure 3, is provided instead, between the flywheel 7' and the prime mover 10'. The electro-magnet of this clutch 16 is supplied with direct current from an independent source 26, through a circuit 51 when the primary motor 10 is running. The auxiliary contacts 52 mounted on the automatic switch 43 supply the circuit 51 from the auxiliary source 26, when the break switch 43 is open. A current reverse relay 44 is mounted in the circuit which includes the lines 14 and, if the current in these lines reverses, the relay 44 opens the circuit 45 which includes the coil 46 of the automatic switch 34. Consequently, if the propeller shaft 1 slows down too much, or stops, the current tends to reverse itself in the line 14 and the relay 44 functions. The automatic break switch 43 then opens and simultaneously closes the auxiliary contacts 52 thereby delivering current from the auxiliary source 26 to the electromagnet of the magnetic clutch 16. The two plates of the magnetic clutch are thus drawn together and the flywheel 7' starts the prime mover 10', which goes into operation immediately. The auxiliary power source which now consists of the prime mover 10' and the principal alternator 2' is thus substituted for the power source consisting of the motor 15 and generator 13 which has failed.

What we claim is:

1. Apparatus for supplying electric current to the distribution lines of a ship driven by a propeller mounted on a main propeller shaft, said apparatus comprising at least one alternator supplying said distribution lines, means through which one alternator is driven from said propeller shaft, and a flywheel rigidly connected to the same alternator, a prime mover, means for automatically disconnecting said alternator from said propeller shaft and starting said prime mover when the speed of said propeller shaft falls below a predetermined figure, said flywheel driving the alternator to which it is connected after the latter has been disconnected from said propeller shaft, and means for connecting said prime mover to said distribution lines through an alternator to supply them with electric current when said prime mover has attained a speed sufficient to enable it to so drive said alternator as to supply said distribution lines with power of the desired frequency and voltage.

2. Apparatus for supplying electric current to the distribution lines of a ship driven by a propeller mounted on a main propeller shaft, said apparatus comprising a main alternator normally supplying said distribution lines driven from said propeller shaft and provided with a rotor mounted on a drive shaft, a flywheel fixed to said drive shaft to turn with said rotor, clutch means between said propeller shaft and alternator, an auxiliary alternator, a prime mover connected to drive said auxiliary alternator, means for starting said prime mover, automatic means for simultaneously releasing said clutch to disconnect said main alternator from said propeller shaft when the speed of said propeller shaft falls below a predetermined figure and actuate said starting means to start said prime mover and auxiliary alternator, said flywheel driving said main alternator after said clutch has been disconnected, and means for connecting said auxiliary alternator to and disconnecting said main alternator from said distribution lines when said auxiliary alternator has attained a speed sufficient to supply said distribution system with power of the desired frequency and voltage.

3. Apparatus as claimed in claim 2 in which said main alternator is driven by said propeller shaft through differential gearing comprising two driving gears and an output gear the speed of which is the average of that of the two input gears, one of said driving gears being driven through a variable speed motor, and means responsive to the speed of said alternator which increases the speed of said variable speed motor whenever the speed of said alternator decreases, so long as the speed of said propeller shaft remains above said predetermined figure.

4. Apparatus as claimed in claim 3 in which said speed responsive means comprises a tachometric generator driven by said alternator, a voltage regulator responsive to the speed of said tachometer generator, and a servo-motor controlled by said voltage regulator, said variable speed motor comprising a commutator and a pair of brushes engaging said commutator and thereby regulating the speed of said variable speed motor, the position of said brushes being determined by said servo-motor.

5. Apparatus as claimed in claim 2 in which said means for connecting said auxiliary alternator to the distribution lines comprises a speed responsive device adapted to close a switch connecting said auxiliary alternator to said distribution lines through a resistance, and acting through time delay means to close a second switch eliminating said resistance from the circuit shortly thereafter.

6. Apparatus as claimed in claim 2 in which said main alternator is driven by said propeller shaft through an electrical transmission comprising a generator driven by said propeller shaft which drives a variable speed motor which drives said main alternator through a mechanical coupling, and means responsive to the speed of said alternator for varying the excitation of said propeller shaft driven generator and said motor, increasing said excitation as said alternator speed decreases.

7. Apparatus for supplying electric power to the distribution lines of a ship driven by a propeller mounted on a main propeller shaft, said apparatus comprising an alternator supplying power to said distribution lines, means through which said alternator is normally driven from said propeller shaft, a fly wheel mounted to turn with the rotor of said alternator, a prime mover, clutch means connecting said prime mover to said alternator, and automatic means for disconnecting said alternator from said propeller shaft and engaging said clutch to connect it to said prime mover when the speed of the propeller shaft falls so low that it can no longer drive said alternator at a speed sufficient to enable it to supply said distribution lines with power of the desired voltage and frequency.

8. Apparatus as claimed in claim 7 in which said main alternator is driven by said propeller shaft through an electrical transmission comprising a generator driven by said propeller shaft which drives a variable speed motor which drives said main alternator through a mechanical coupling, and means responsive to the speed of said alternator for varying the excitation of said propeller shaft driven generator and said motor, increasing said excitations as said alternator speed decreases.

9. Apparatus for supplying electric power on board ship comprising a main A.C. generator adapted to be driven by the ship's propeller shaft through a variable speed transmission, a clutch between said transmission and generator, means for automatically disengaging said clutch when the speed of said propeller shaft falls below a predetermined critical speed, a flywheel connected to said main generator to drive it after said clutch has been disengaged, an auxiliary prime mover automatically started when said clutch is disengaged, an auxiliary generator driven by said prime mover, means controlled by the speed and frequency of the auxiliary generator for connecting it to the distribution lines in parallel with the main generator while said frequency is still a little less than that of the main generator, said connecting means comprising resistances placed temporarily in circuit between said auxiliary generator and distribution lines but short circuited after synchronism has been attained.

10. Apparatus as claimed in claim 1 comprising a variable speed transmission connecting said propeller shaft to said main generator, said transmission comprising a variable speed commutator motor provided with means for varying its speed by varying the position of its brushes on its commutator ring, said means comprising a gear train driven by a servo motor, the speed of said servo motor being controlled by a saturable reactor type frequency regulator responsive to the frequency of the current in said distribution lines.

11. Apparatus as claimed in claim 1 in which said main generator is connected to two clutches, and comprising an electro-mechanical transmission constituted by an electric generator driven by said propeller shaft and supplying an electric motor adapted to be coupled to said main generator through one of said clutches, a prime mover adapted to be connected through the other clutch to said main generator, and automatic means for engaging and disengaging said clutches.

12. Apparatus as claimed in claim 1 comprising a D.C. generator mounted on said propeller shaft, a D.C. motor driven by said D.C. generator and driving said main generator, which is an alternator, a fly wheel on the shaft of said main generator, a clutch between the motor and main generator, and circuit breakers between the D.C. generator and D.C. motor, and between the main generator and the distribution lines.

13. Apparatus as claimed in claim 1 in which said propeller shaft turns at a varying speed and drives said alternator through a variable speed transmission, said transmission being provided with means for automatically varying the ratio between the speeds of said propeller shaft and alternator inversely with the speed of said propeller shaft so long as said propeller shaft speed exceeds said predetermined figure.

References Cited in the file of this patent

UNITED STATES PATENTS

| | | |
|---|---|---|
| 943,434 | Maier | Dec. 14, 1909 |
| 996,334 | Haskins | June 27, 1911 |
| 1,703,064 | Griffiths | Feb. 19, 1929 |
| 2,179,370 | Day | Nov. 7, 1939 |
| 2,476,086 | Dorey | July 12, 1949 |

FOREIGN PATENTS

| | | |
|---|---|---|
| 1,090,723 | France | Oct. 20, 1954 |
| 721,933 | Great Britain | Jan. 12, 1955 |